United States Patent

Lee et al.

[15] 3,700,998

[45] Oct. 24, 1972

[54] SAMPLE AND HOLD CIRCUIT WITH SWITCHING ISOLATION

[72] Inventors: Don N. Lee, Lindenwold; Roy B. McMennamin, Cinnaminson, both of N.J.

[73] Assignee: Computer Test Corporation

[22] Filed: Aug. 20, 1970

[21] Appl. No.: 65,388

[52] U.S. Cl. ....................................................320/1
[51] Int. Cl. ............................G06g 7/02, H03f 1/00
[58] Field of Search .................320/1; 307/109, 110; 340/173 CA

[56] References Cited

UNITED STATES PATENTS

| | | | |
|---|---|---|---|
| 3,098,214 | 7/1963 | Windes | 320/1 X |
| 2,843,736 | 7/1958 | Huntley | 320/1 |
| 3,157,859 | 11/1964 | Moore | 320/1 X |
| 3,075,086 | 1/1963 | Mussard | 320/1 X |
| 3,311,740 | 3/1967 | Urban | 320/1 X |

*Primary Examiner*—Bernard Konick
*Assistant Examiner*—Stuart Hecker
*Attorney*—Maleson, Kimmelman and Ratner and Allan Ratner

[57] ABSTRACT

Sampling an unknown signal only for a single time interval and holding the resultant sampled signal value with these operations being substantially independent of frequency. A discharge circuit in shunt with the storage capacitor comprises a diode bridge having four matched diodes. A pair of common mode chokes are connected to the nodes of the diode bridge in order to provide isolation between the switching signal of the discharge circuit and the storage capacitor.

6 Claims, 2 Drawing Figures

INVENTORS
DON N. LEE
ROY B. McMENNAMIN
BY
Maleson, Kimmelman & Ratner
ATTORNEYS

SAMPLE AND HOLD CIRCUIT WITH SWITCHING ISOLATION

BACKGROUND OF THE INVENTION

1. Field of the Invention

This invention relates to the field of art of charge storage circuits.

2. Prior Art

It has been known to use charge storage circuits as the basic storage elements in sample and hold systems. An important application of such sample and hold systems is in single shot sampling of an unknown input signal containing a high frequency component. In this application, the input signal is only sampled for a single short sampling time interval, as for example, 5 nanoseconds and stored. In order to store an accurate value corresponding to the amplitude of the sampled unknown input signal, the sampling time is required to be short as compared with the period of the highest frequency components of the input signal. It is also desirable in many applications to sample and hold at a substantially high repetition rate.

Associated with substantially short interval sampling, an efficiency factor is introduced which is defined as the ratio of the sampled value being held or stored in a storage capacitor with respect to the actual value of the input signal during the sampled interval. In practical systems, since this efficiency factor is less than 1, the stored sampled value does not equal the input signal but does equal the product of the efficiency factor times the input signal.

The actual value stored in the storage capacitor decays exponentially after a sample has been taken and stored. If the next sample occurs after the stored value has fully decayed and the storage capacitor has been fully discharged, then the value which is stored is equal to the efficiency factor times the value of the input signal. Thus, the stored value is directly proportional to the input signal. On the other hand, if the sampling frequency or repetition rate is relatively high, the next sample may occur before the storage capacitor has fully discharged. Accordingly, the new stored value becomes equal to the product of the efficiency factor times the difference between the input signal and the residual value stored on the capacitor resulting from the incomplete decay of the previous storage operation. Thus, the stored value includes an additive error which is equal to the product of the quantity 1 minus the efficiency factor times the residual value.

It will thus be understood that in the case of a substantially high repetition rate, it is required that the storage capacitor be fully discharged prior to the next sampled unknown input signal in order to achieve storage of an accurate value corresponding to the amplitude of the sampled input signal. Such full discharge has previously been attempted using a complementary pair of bipolar transistors or alternatively a field effect transistor. While these discharge circuits provide a bipolar clear current for the storage capacitor, they leave much to be desired. Specifically, in the case of the transistor pair, the trailing edge of the switching pulse for the clearing circuit is coupled to the storage capacitor by the base to collector capacitance of the transistors. This charges the storage capacitor with an error value which may even exceed the residual value. Similarly, with the field effect transistor clear circuit the capacitance between the gate and drain electrodes provides a coupling path for the trailing edge of the switching pulse causing a similar error.

SUMMARY OF THE INVENTION

A discharging circuit for a storage capacitor in which the storage capacitor has one terminal connected to ground and one terminal connected to the discharge circuit. The discharge circuit comprises a diode bridge having four matched diodes and a first and a second pair of opposing nodes. A common mode choke is provided having a first and a second section with the first choke section being connected between the storage capacitor and a first node of the first node pair. The second choke section is connected between a second node of the first node pair and ground. A switching circuit is connected to the second node pair and is operable for switching the bridge on and off. With the bridge turned on, the storage capacitor discharge current is restricted to a low impedence path through common mode choke and the diode bridge to ground.

Further, an additional common mode choke is provided which is connected between the switching circuit and the respective nodes of the second node pair for restricting the turn on signal for the diode bridge to the current path provided by the diode bridge and this additional choke. In this manner, the discharging of the storage capacitor is effected with substantially little coupling between the switching circuit and the capacitor to completely discharge the capacitor and eliminate any residual charge. When the discharge circuit is used in a sample and hold system any error value of charge on the capacitor produced by coupling of the turn on signal is negligible.

Figures 1, 2:
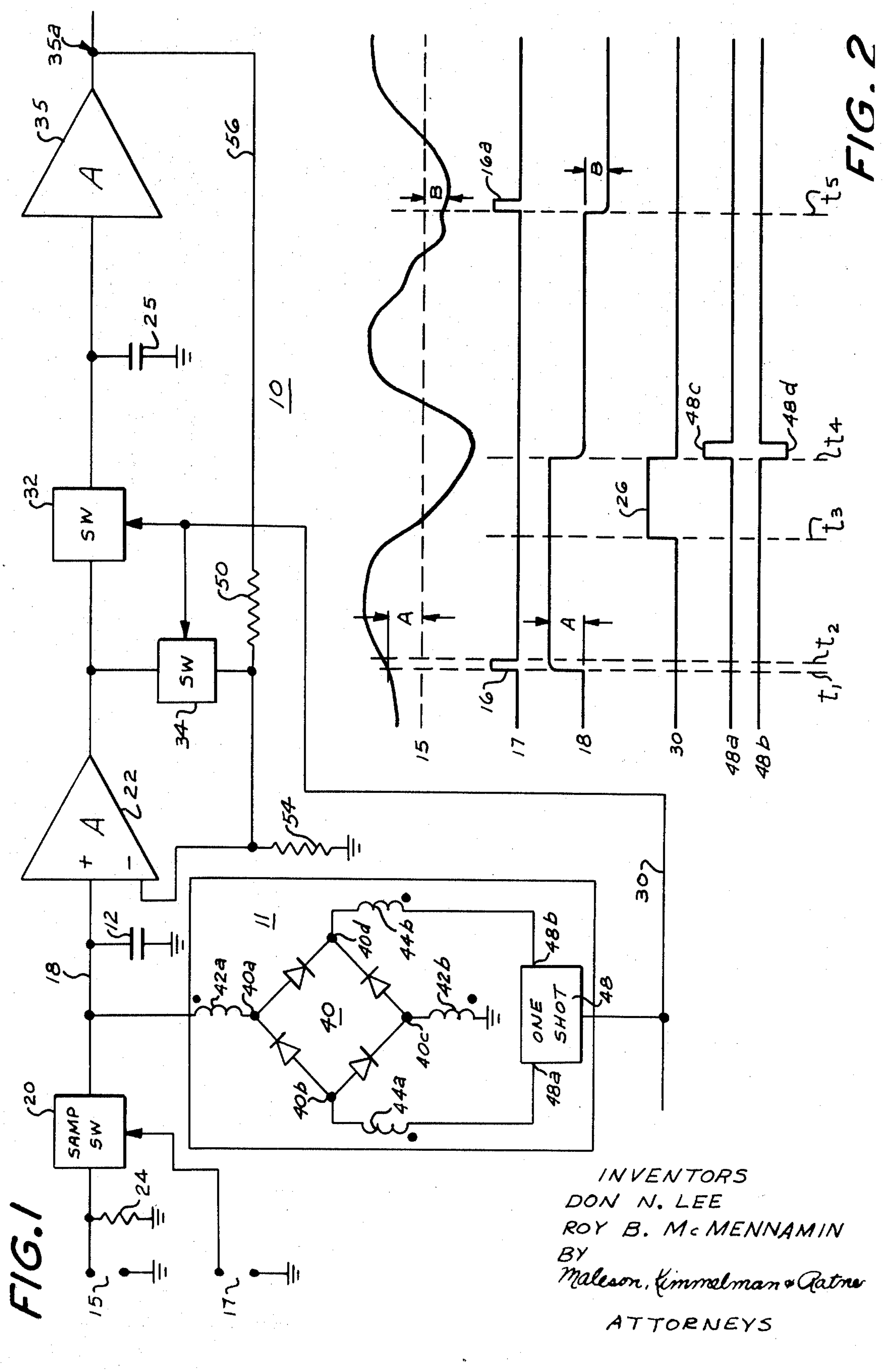
FIG. 1 illustrates in schematic and part block diagram form a frequency independent sample and hold system embodying the invention.
FIG. 2 illustrates waveforms helpful in explaining the operation of FIG. 1.

Referring to the drawing, there is shown a clear circuit 11 used for fully discharging a temporary storage capacitor 12 of a sample and hold system 10 in order to allow sample and hold operations substantially independent of frequency. As previously described, the input signal applied to input 15 may be an unknown signal having a high frequency component and therefore is required to be sampled during a substantially short sampling interval. To achieve this short sampling interval, a sampling pulse 16 at time $t_1$ is applied to input 17 to turn on diode sampling bridge 20 for a substantially short interval, as for example, 5 nanoseconds. With bridge 20 turned on, the sampled value of the unknown signal is effective by way of conductor 18 to charge a short term storage capacitor 12 which is connected to a reference potential (ground). Capacitor 12 is preferably of substantially low capacitive value, as for example, 20 picofarads in order to provide a short time constant for charge. It will be understood that the unknown signal is only sampled for the duration of sampling pulse 16 to store the resultant sampled value on capacitor 12.

The short time constant for charging capacitor 12 may be explained by examining the components connected to the capacitor with bridge 20 turned on. The ungrounded end of capacitor 12 is connected by way of conductor 18 to the input of a high impedence amplifier 22. In addition, conductor 18 is connected to clear circuit 11 which is turned off during sampling time and thus provides a high impedence. Further, conductor 18 is connected by way of turned on bridge 20 to ground by way of a low value shunt impedence 24 which matches the source impedence across input terminal 15. In this manner, the input impedence of amplifier 22 and the clear circuit 11 have negligible effect upon the time constant of the charging of capacitor 12. The charging time constant of this capacitor is substantially proportional to the value of capacitor 12 times the sum of the low value resistance of bridge 20 and shunt resistance 24. In this manner, capacitor 12 provides a "-snap shot" look at the unknown signal at input 15.

At time $t_2$ sampling pulse 16 terminates, thereby ending the sampling interval which is effective to turn off bridge 20. Thus, capacitor 12 sees not only the parallel high impedences of amplifier 22 and clear circuit 11 but also the high impedence of turned off bridge 20. However, as previously described, capacitor 12 is of substantially low capacitive value and thus the discharge time constant through amplifier 22 is relatively short, as for example, 100 microseconds. This time constant is not sufficient for most applications of a sample and hold system. Thus, the stored sampled signal on capacitor 12 is transferred to a long term storage capacitor 25.

Specifically, at time $t_3$ the leading edge of a transfer pulse 26 is applied by way of a conductor 30 to turn on an electronic switch 32 connected between the output of amplifier 22 and the ungrounded terminal of capacitor 25. The other terminal of capacitor 25 is connected to ground. The ungrounded terminal of capacitor 25 is also connected to an input of a high impedence amplifier 35 the output of which is applied by way of a conductor 56 and a feedback resistor 50 to a differential input of amplifier 22. Pulse 26 is also effective to turn off an electronic switch 34 connecting the output of amplifier 22 with the foregoing differential input. Switch 32 remains turned on completing a feedback loop around amplifiers 22 and 35 for the duration of transfer pulse 26 which terminates at time $t_4$. In this manner, the stored potential level on capacitor 12 is transferred to long term storage on capacitor 25. At the termination of pulse 26 (time $t_4$) switch 32 is turned off and switch 34 is turned on. Though the feedback loop from the output of amplifier 35 has been opened, a feedback loop around amplifier 22 is maintained by closed switch 34 to prevent saturation of this amplifier during the time of short term storage.

Long term storage capacitor 12 has a substantially larger capacitive value than capacitor 12 and may be, for example, 0.01 microfarads. With switch 32 turned off, the discharge time constant associated with capacitor 25, the high impedence of amplifier 35 and turned off switch 32 may be in the order of one second. In this manner, long term storage is accomplished of a sampled value of an unknown input signal having a high frequency component.

For accurate measurement substantially independent of frequency, capacitor 12 is required to be discharged by clear circuit 11 following transfer to capacitor 25 and prior to the next sampling operation, thereby allowing a high repetition rate of sampling pulse 16. In the operation of system 10, the clear operation begins at time $t_4$ with the actuation of discharge circuit 11. The next sampling operation is initiated by the next trigger pulse 16*a* at $t_5$.

Discharge circuit 11 includes a diode bridge which when turned on provides a low impedence shunt across capacitor 12. The effective low impedence shunt discharge path may be traced from conductor 18 through a first common mode choke section 42*a*, bridge 40 and a second common mode choke section 42*b* to ground. Common mode choke sections 42*a–b* are coupled with a high coefficient of coupling in the manner indicated and are known in the art as baluns. Each of the pair of choke sections 42*a–b* and 44*a–b* are bifilar wound on a high permeability solid core. First choke section 42*a* is connected to bridge 40 at node 40*a* and second choke sections 42*b* is connected to bridge 40 at opposing node 40*c*.

The other pair of opposing nodes 40*b,d* are respectively connected by way of first and second common mode choke sections 44*a–b*, respectively, to the 1 and 0 outputs 48*a–b* of a one-shot 48. The trigger input for one-shot 48 is connected to conductor 30 to which transfer pulse 26 is applied to produce clear signals.

Diode bridge 40 may comprise four diodes in a single chip monolithic structure in which diode mismatch is minimized. In order to increase speed of operation of the diodes, bridge 40 may be constructed of hot carrier diodes although in most applications, the clear operation is not required to be as fast as that of sampling bridge 20.

In operation, at time $t_4$, one-shot 48 is switched to its quasi-stable state upon application of the falling edge of transfer pulse 26. As illustrated, complementary output signals 48*c–d* are produced at 1 and 0 outputs 48a-b respectively of one-shot 48 which are applied through choke sections 44*a–b* respectively to provide turn on current for diode bridge 40. The indicated coupling of choke sections 44*a–b* causes bridge turn on current flow through these choke sections to be restricted to the foregoing path. With bridge 40 turned on, capacitor 12 discharges through an effective path of choke sections 42*a–b* and bridge 40. In this manner, there is substantially low impedence shunt to ground across capacitor 12 with bridge 40 turned on and there is substantially little coupling between the bridge turn on current from one-shot 48 to storage capacitor 12. Thus, a negligible error signal is coupled from the bridge turn on current to capacitor 12.

What is claimed is:

1. A discharging system for a storage capacitor providing a low impedence discharge path in which said storage capacitor has a first terminal connected to a point of reference potential and a second terminal connected to said discharging system comprising
   - means connecting a diode bridge having four matched diodes between said second terminal and said point of reference potential,
   - switching means for producing bridge turn on and turn off signals,
   - current restricting means connecting said switching means to said diode bridge whereby a substantially small value of coupling is provided between said switching means and said capacitor, said diode bridge having a first and second pair of opposing nodes, an additional current restricting means connecting (1) said capacitor second terminal to said diode bridge and (2) said diode bridge to said point of reference potential to restrict discharge current flow, a common mode choke having a first and a second section, said first choke section being connected between said second terminal and a first node of said first node pair, said second choke section being connected between a second node of said first node pair and said point of reference potential, and said switching means being connected to said second node pair operable for switching said diode bridge between the on and off state whereby with said bridge turned on said storage capacitor discharge current is restricted to a low impedence path by said common mode choke and bridge to said point of reference potential.

2. A discharging system for a storage capacitor providing a low impedence discharge path in which said storage capacitor has a first terminal connected to a point of reference potential and a second terminal connected to said discharging system comprising means connecting a diode bridge having four matched diodes between said second terminal and said point of reference potential, switching means for producing bridge turn on and turn off signals, current restricting means connecting said switching means to said diode bridge whereby a substantially small value of coupling is provided between said switching means and said capacitor, said diode bridge having a first and second pair of opposing nodes, an additional current restricting means connecting (1) said capacitor second terminal to said diode bridge and (2) said diode bridge to said point of reference potential to restrict discharge current flow, and said switching means comprising a switching circuit having a first and second output and said current restricting means comprising a common mode choke having first and second sections connected between said first and said second switching circuit outputs respectively and said first and second nodes respectively of said second node pair for restricting the turn on signal for said diode bridge through the current path provided by said additional choke, whereby a substantially small value of coupling is provided between said switching means and said capacitor.

3. A system for sampling an unknown signal only a single time interval and holding the resultant sampled signal value and in which said sampling and holding operations are substantially independent of frequency, comprising a storage capacitor having a first terminal connected to a point of reference potential, high impedence amplifier means having an input connected to a second terminal of said storage capacitor, means for sampling said unknown signal only for a single time interval and for applying said sampled signal value to said second terminal of said storage capacitor, discharging means connected in shunt with said storage capacitor comprising a diode bridge having four matched diodes and a first and a second pair of opposing nodes, a common mode choke having a first and a second section, said first choke section being connected between said second terminal and a first node of said first node pair, said second choke section being connected between a second node of said first node pair and said point of reference potential, and switching means connected to said second node pair operable for switching said diode bridge between the on and off state whereby with said bridge turned on said storage capacitor discharge current is restricted to a low impedence path by said common mode choke and bridge to said point of reference potential in preparation for a next sample and hold operation.

4. The system of claim 3 in which said switching means comprises a switching circuit having a first and a second output for providing bridge turn on signal, and an additional common mode choke having first and second sections connected between said first and said second switching circuit outputs respectively and said first and second nodes respectively of said second node pair for restricting the turn on signal for said diode bridge through the current path provided by said additional choke.

5. The system of claim 4 in which there is provided an additional amplifier means, a negative feedback circuit connected between an output of said additional amplifier means and a differential input of said high impedence amplifier means, long term storage means connected to an input of said second amplifier means, and a first switching device connected between said first and second amplifier means, switching means for turning on said first switching device for completing a negative feedback loop through said additional amplifier means and said feedback circuit thereby to transfer said stored sampled signal from said storage capacitor to said long term storage capacitor.

6. The system of claim 5 in which there is provided a second switching device connected between an output and an input of said high impedence amplifier means, said switching means (1) turning off said second switching device and turning on said first switching device and (2) turning off said first switching device and turning on said second switching device to close a negative feedback loop for said high impedence amplifier means through said second switching device whereby a negative feedback loop is continuously provided for said high impedence amplifier means thereby maintaining it in an unsaturated state.

* * * * *